US006938054B2

(12) United States Patent
Goode et al.

(10) Patent No.: US 6,938,054 B2
(45) Date of Patent: Aug. 30, 2005

(54) SYSTEMS, METHODS, AND COMPUTER PROGRAM PRODUCTS TO OPTIMIZE SERIALIZATION WHEN PORTING CODE TO IBM S/390 UNIX SYSTEM SERVICES FROM A UNIX SYSTEM

(75) Inventors: David H. Goode, San Jose, CA (US); William E. Malloy, Santa Clara, CA (US)

(73) Assignee: International Business Machines Corporation, Armonk, NY (US)

(*) Notice: Subject to any disclaimer, the term of this patent is extended or adjusted under 35 U.S.C. 154(b) by 467 days.

(21) Appl. No.: 10/305,307

(22) Filed: Nov. 25, 2002

(65) Prior Publication Data

US 2004/0103110 A1 May 27, 2004

(51) Int. Cl.[7] .............................................. G06F 7/00
(52) U.S. Cl. ...................... 707/104.1; 707/101; 707/102
(58) Field of Search .................................. 707/1–104.1

(56) References Cited

U.S. PATENT DOCUMENTS

| | | | |
|---|---|---|---|
| 4,584,644 A | | 4/1986 | Larner ........................ 364/200 |
| 4,631,674 A | | 12/1986 | Blandy ....................... 364/300 |
| 5,081,572 A | | 1/1992 | Arnold ....................... 395/375 |
| 5,093,912 A | | 3/1992 | Dong et al. ................. 395/650 |
| 5,615,374 A | | 3/1997 | Sadoi et al. ................ 395/726 |
| 5,931,925 A | | 8/1999 | McNabb et al. ............. 710/52 |
| 6,112,222 A | * | 8/2000 | Govindaraju et al. ....... 718/102 |
| 6,237,019 B1 | * | 5/2001 | Ault et al. .................. 718/104 |
| 6,266,783 B1 | | 7/2001 | Allen et al. ..................... 714/5 |
| 6,269,480 B1 | | 7/2001 | Curtis .......................... 717/11 |
| 6,272,518 B1 | | 8/2001 | Blazo et al. ................. 709/102 |
| 6,298,345 B1 | | 10/2001 | Armstrong, Jr. et al. ........ 707/8 |
| 6,697,834 B1 | * | 2/2004 | Dice ........................... 718/102 |
| 6,823,511 B1 | * | 11/2004 | McKenney et al. .......... 718/102 |
| 6,842,809 B2 | * | 1/2005 | Browning et al. ........... 710/200 |
| 6,883,026 B1 | * | 4/2005 | Onodera et al. ............. 709/223 |
| 2001/0014905 A1 | * | 8/2001 | Onodera ...................... 709/102 |
| 2002/0199045 A1 | * | 12/2002 | Browning et al. ........... 710/100 |

OTHER PUBLICATIONS

Killenberger et al., "Building a Java virtual machine for server applications: The Jvm on OS/390", IBM Systems Journals, vol. 39, No 1, 2000, pp. 194–210.*
Ed Prosser, "Follow a roadmap—Porting Central", IBM Virtual Innovation Center for Hardware, pp. 1–34.*
Brian Goetz, "Java theory and practice: Going atomic—The new atomic classes are the hidden gems of java.util.concurrent", IBM, Nov. 23, 2004, pp. 1–6.*
Angiulli, JM, et al., *Performance Enhancement for IBM System/370* IBM TDB vol. 24, No. 1B, p. 628–629, Jun. 1981.
Latridis, Matthew, *Porting the Lotus Domino Server,* 6 pages. http://www-1.ibm.com/servers/eserver/zseries/zos/unix/porting/lotus.html).
*Compare and Swap,* IBM OS/390, C/C++ Run-Time Library Reference, vol. 1, Eighth Edition, Sep. 2000, p. 252.
$pthread\_mutex\_{trylock}()$—*Attempt to Lock a Mutex Object,* OS/390 C/C++ Run-Time Library Reference, vol. 2, Eighth Edition, Sep. 2000, pp. 1040–1041.

* cited by examiner

*Primary Examiner*—Luke S. Wassum
*Assistant Examiner*—Linh Black
(74) *Attorney, Agent, or Firm*—Christine H. Smith

(57) ABSTRACT

Systems, methods, and computer products that determine how to optimize serialization code that has been ported from other computer systems to the OS/390 UNIX system. General-purpose UNIX systems may not provide sufficient facilities; such as compiler run-time APIs like the Compare and Swap C Run-Time Library API, to accommodate the performance-related features of serialized code in complex applications. When porting a high-performance application from other UNIX platforms to IBM OS/390 UNIX, serialized code performance of the application may be limited. The present invention may be implemented by advantageously determining when substitution of the Compare and Swap C Run-Time Library API calls for pthread_mutex calls will improve the execution of serialized code on the IBM OS/390 UNIX system.

19 Claims, 13 Drawing Sheets

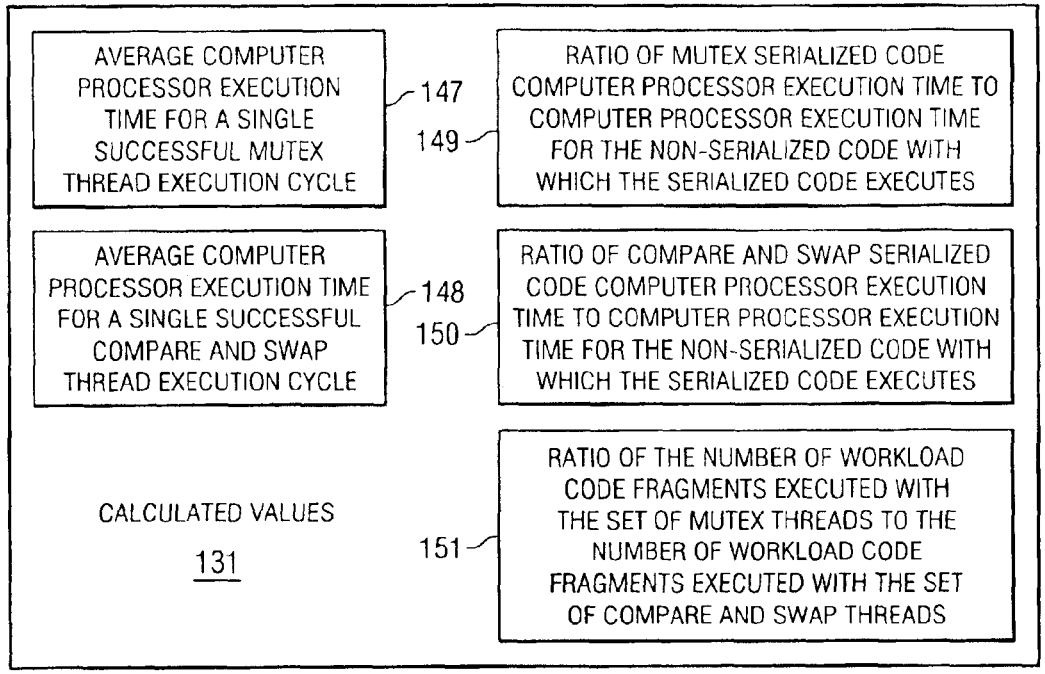

*FIG. 1E*

2209 — *MUTEX THREADS SUMMARY*
  116 — 4 THREADS FOR 4 SECONDS WITH 10 WORKLOAD ITERATIONS   170
     TOTAL SUCCESSFUL MUTEX ACQUISITIONS - 227801 — 139
  142 — TOTAL CPU TIME IN SECONDS          - 10
  141 — TOTAL NUMBER OF WORKLOAD OPERATIONS - 6.47e+10
  147 — AVERAGE CPU TIME FOR SUCCESSFUL SERIALIZATION AND EXECUTION
     OF 10 WORKLOAD ITERATIONS: 49.48 MICROSECONDS
2210 — *COMPARE AND SWAP THREADS SUMMARY*
  116 — 4 THREADS FOR 4 SECONDS WITH 10 WORKLOAD ITERATIONS
  143 — TOTAL SUCCESSFUL CS CALLS      - 1920844
  146 — TOTAL CPU TIME IN SECONDS       - 17
  145 — TOTAL NUMBER OF WORKLOAD OPERATIONS - 4.55e+12
     AVERAGE CPU TIME FOR SUCCESSFUL SERIALIZATION AND EXECUTION
  148 — OF 10 WORKLOAD ITERATIONS: 9.80 MICROSECONDS
2211 — TOTAL CPU TIME FOR 102963 FAILED CS FUNCTION CALLS = LESS THAN 1 SECOND
  151 — RATIO OF CONTEXT TO SERIALIZED CODE TIME: 11.17
  190 — ===> 70.28 TIMES MORE WORKLOAD OPERATIONS USING CS

*FIG. 1F*

| FIGURE 2A |
| FIGURE 2B |
| FIGURE 2C |
| FIGURE 2D |
| FIGURE 2E |
| FIGURE 2F |
| FIGURE 2G |
| FIGURE 2H |
| FIGURE 2I |

SYSTEMS, METHODS, AND COMPUTER PROGRAM PRODUCTS TO OPTIMIZE SERIALIZATION WHEN PORTING CODE TO IBM S/390 UNIX SYSTEM SERVICES FROM A UNIX SYSTEM

BACKGROUND OF THE INVENTION

1. Field of the Invention

The present invention is directed to the field of porting computer code. It is more particularly directed to optimizing serialization code when porting high-performance applications to IBM S/390 UNIX System Services from other UNIX systems.

2. Description of the Background Art

Typically complex computer applications, such as a database, are ported to a variety of computer systems. The porting process often includes special changes to the application to enable efficient and complete operation of the application on different computer systems. Serialized code operations are a significant factor in the overall performance of a complex computer application. High-performance computer applications, such as a database, may require serialization of the code used to access data to ensure that certain data access operations are performed before others are subsequently performed. Such serialization may not be supported by efficient techniques on the target system. A "target computer system" as used herein refers to a computer system environment consisting of one or more specific programming languages, such as the C programming language, and the application programming interfaces (APIs) available in the programming languages. Therefore, changes to serialization operations may be made during the porting of an application to ensure efficient operation of the application on the target computer system. Such a target computer system may include the products sold under the trademarks IBM S/390® that includes the IBM OS/390® (OS/390) operating system, the z/OS operating system, and the UNIX System Services for the IBM OS/390® (OS/390 UNIX).

On systems sold under the trademark UNIX, serialization is typically implemented using C program run-time APIs such as pthread_mutex_lock, pthread_mutex_trylock, and pthread_mutex_unlock. These mutex serialized operations and other such C program run-time APIs will be referred to herein as "pthread_mutex calls." The OS/390 UNIX provides a "Compare and Swap" C Run-Time Library API that requires less computer instructions to execute than standard UNIX run-time APIs, such as the pthread_mutex calls, and which may sometimes be used in their place. It will be understood that the terms "Compare and Swap C Run-Time Library API" and "Compare and Swap API" will be used interchangeably herein. Under certain circumstances, the Compare and Swap API serialized operations may perform more than one hundred times faster during computer program execution than the standard pthread_mutex calls. It would be advantageous to be able to determine when serialization operations on the OS/390 UNIX will perform faster by using the Compare and Swap API instead of the standard pthread_mutex calls. Therefore when appropriate, it would be advantageous if serialized operations on the OS/390 UNIX system could take advantage of the highly efficient Compare and Swap API.

From the foregoing it will be apparent that there is still a need to improve the techniques of serialization on the OS/390 UNIX systems over the past. More particularly, existing systems have not been able to determine when taking advantage of the Compare and Swap API of the OS/390 UNIX would improve performance of serialization code that has been ported from other computer systems to the OS/390 UNIX target computer system.

SUMMARY OF THE INVENTION

An embodiment of the present invention relates to systems, methods, and computer products that optimize serialization code when porting high-performance applications to an OS/390 UNIX computer system from other UNIX computer systems. The preferred embodiment of the present invention determines whether the Compare and Swap API would improve performance of serialization code that has been ported from other computer systems to the OS/390 UNIX target computer system. More particularly, the preferred embodiment of the present invention determines when to take advantage of the dramatically shorter instruction path of the Compare and Swap API of the OS/390 UNIX over typical UNIX serialization management operations such as the pthread_mutex calls. It will be appreciated that programmatically invoking code is typically referred to as "calling" program code. Moreover and when appropriate, the preferred embodiment of the present invention novelly uses C program function calls to the Compare and Swap API of the OS/390 UNIX, for improvement of the performance of certain serialization code in high-performance applications that have been ported to the OS/390 UNIX system.

Typically, serialization programming is associated with managing instances of threads of program code that require access to at least one common computer resource. A thread of program code typically has an execution state, maintains execution context when not executing, and has access to computer resources that enable execution of the program code thread. When a function call to a C program pthread_mutex call is made, a lock of the data area associated with access to a common computer resource is accessed and execution of the thread of program code that accesses or manipulates that resource is permitted and continues until reference to or manipulation of that resource is complete, at which time the operation of the program code will typically relinquish the lock of the data area. During the period of time that the lock is held by a particular program thread, other threads that have also attempted to acquire the lock will be in what is sometimes referred to as a "suspended state." It will be appreciated that the term "lock" herein refers to a lock of the data area that is associated with the common computer resource.

By means of comparison, the Compare and Swap API of the OS/390 UNIX does not operate by managing program code locks, and instead uses a test to determine if a simple unit of program storage has a particular value indicating whether a process thread has control of a resource. The preferred embodiment of the present invention uses the value determined by the test of the Compare and Swap API as a lock mechanism that enables synchronization of serialized code.

In the preferred embodiment of the present invention the simple unit of program storage is a small area of contiguous computer storage four bytes in length. In an alternative embodiment of the present invention the simple unit of program storage may be any number of bytes in length. For example, a Compare and Swap Double API operates on an eight-byte area, and while the Compare and Swap API may be used to update singly linked lists safely the Compare and Swap Double API may safely update doubly linked lists. Those skilled in the art will appreciate the operation of singly linked lists and doubly linked lists. Further, by means of example the Compare and Swap Double may be used instead of the Compare and Swap API in the operation of the present invention. Typically, the Compare and Swap API links the following operations into a single, atomic operation: (i) determine the current value of the data area to be locked; (ii) compare the current value of the data area to be locked to a previously-acquired copy of the value in the data area to be locked; and (iii) if the current value and the previously-acquired value of the data area to be locked are equal, then store a new value into the data area to be locked. It will be appreciated that a data area may contain an aggregation of associated data and is not constrained as to format. If the Compare and Swap API is called simultaneously from two or more invoking program code routines that point to the same data area to be locked, at most one call to the Compare and Swap API will succeed in updating the data area.

In the preferred embodiment of the present invention, the operation of testing the state of a four-byte area of program code storage is an efficient operation that ensures that the associated thread of program code is immediately executed. The operation of the Compare and Swap API of the OS/390 UNIX requires many fewer program code instructions than the typical pthread_mutex calls. The preferred embodiment of the present invention determines when to use the Compare and Swap API to support efficient execution of serialized program code.

When porting program code that uses pthread_mutex calls, it is not always advantageous to replace those calls with functionally equivalent Compare and Swap API calls when they are coupled with simple program code loops that attempt to modify program storage as a locking mechanism. Since the execution of such loops does not yield control of the computer system, the loop execution consumes computer system resources from the time the acquisition of a lock is attempted until it succeeds. pthread_mutex calls, by contrast, may yield control of the computer system resources if a lock is unavailable even when coupled with simple loop program code. Therefore, programs employing these calls generally stop consuming computer resources until the lock is available. Because of the complexity of the computer system code required to implement pthread_mutex API calls, it is possible to iteratively call the Compare and Swap API hundreds of times without consuming as many computer system resources as a single pthread_mutex call. When the use of computer system resources during the execution of a serialized code segment is small by comparison the use of computer system resources required during the execution of pthread_mutex calls, it may be advantageous to substitute locking mechanisms employing the Compare and Swap API for locking mechanisms of the pthread_mutex call. Based on comparison of computer resource execution time of the pthread_mutex calls to the Compare and Swap APIs, the preferred embodiment of the present invention enables the determination of whether the use of Compare and Swap APIs is more efficient than the use of standard UNIX run-time APIs, such as pthread_mutex calls, when porting high-performance applications to OS/390 UNIX from other UNIX systems.

An embodiment of the present invention is achieved by systems, methods, and computer products that improve the performance of certain serialized program code that is ported from other computer systems to an OS/390 UNIX system. The preferred embodiment of the method of the present invention comprises: (a) building a Serialization Test and Comparison (STAC) Tool if it is advantageous to use such a tool to analyze serialized code execution results, the STAC Tool includes: (i) incorporating a workload code fragment into the STAC Tool code, and (ii) compiling and linking the STAC Tool; (b) initiating the execution of the STAC Tool that may include iterative examination of the results of prior execution of the STAC Tool with the workload code fragment, and subsequent adjustment of input parameters used during execution of the STAC Tool; (c) executing the STAC Tool and analyzing the execution results, including: (i) obtaining and evaluating run-time parameters associated with the execution of the STAC Tool, (ii) determining the amount of computer resource time required to execute the workload code fragment, (iii) executing both a set of mutex threads and a set of Compare and Swap threads in association with the workload code fragment, (iv) reporting a set of mutex thread statistics and a set of Compare and Swap thread statistics, (v) and comparing the results of the mutex thread statistics and the Compare and Swap thread statistics that are the results of the execution of the set of threads.

Other aspects and advantages of the present invention will become apparent from the following detailed description, taken in conjunction with the accompanying drawings, illustrating by way of example the principles of the invention.

BRIEF DESCRIPTION OF THE DRAWINGS

In the following detailed description and in the several figures of the drawings, like elements are identified with like reference numerals.

FIG. 1E is a block diagram of the values;

FIG. 1F is a block diagram of a sample report;

FIG. 2I is a flow diagram that illustrates comparing the results of execution of the sets of threads.

DESCRIPTION OF THE INVENTION

Figure 1:
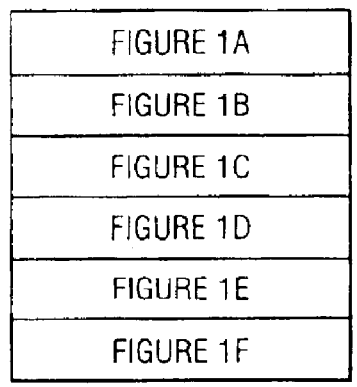
FIG. 1 includes FIG. 1A, FIG. 1B, FIG. 1C, FIG. 1D, FIG. 1E, and FIG. 1F.

As shown in the drawings and for purposes of illustration, the preferred embodiment of the present invention determines when use of the Compare and Swap C API would improve performance of serialization code that has been ported from other computer systems to the OS/390 UNIX target computer system. Existing systems have not been able to adequately improve the performance of serialization code in high-performance applications that are ported to the OS/390 UNIX system from other UNIX systems.

When porting a high-performance application from other UNIX platforms to IBM OS/390 UNIX, serialized code performance of the application may be limited. The present invention may be implemented by advantageously determining when substituting Compare and Swap API calls for pthread_mutex calls will improve the execution of serialized code on the IBM OS/390 UNIX system.

More particularly and when appropriate, the preferred embodiment of the present invention takes advantage of the dramatically shorter instruction path of the Compare and Swap API of the OS/390 UNIX as compared to typical UNIX serialization management operations such as the pthread_mutex calls. The preferred embodiment of the present invention determines when to use C program function calls to the Compare and Swap API of the OS/390 UNIX, for improvement of the performance of certain serialization code in high-performance applications that have been ported to the OS/390 UNIX system. The preferred embodiment of the present invention novelly determines when to use the test of the Compare and Swap API as a lock mechanism that enables efficient synchronization of serialized code.

Figure 1B:
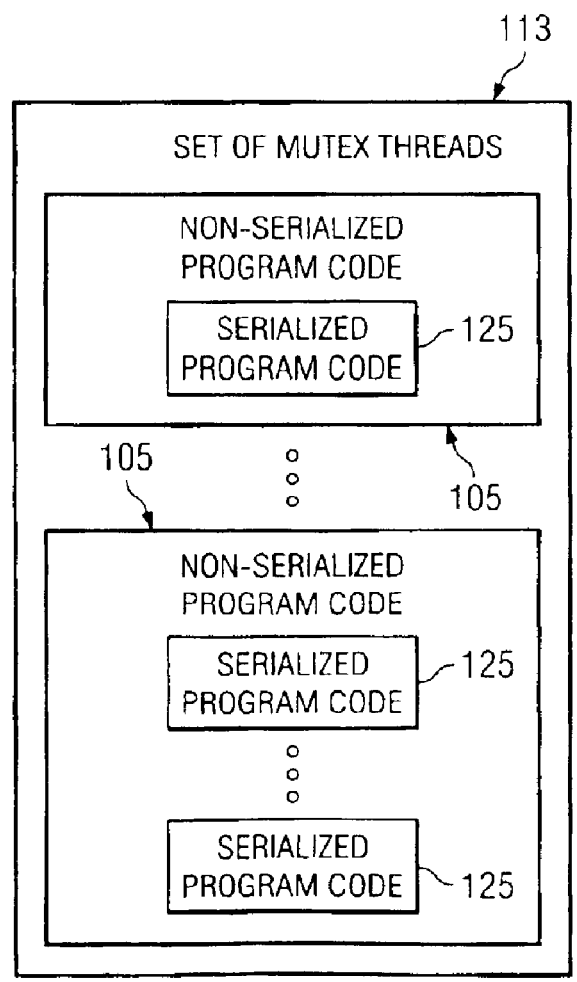
FIG. 1B is a block diagram that illustrates the set of mutex threads.
Figure 1A:
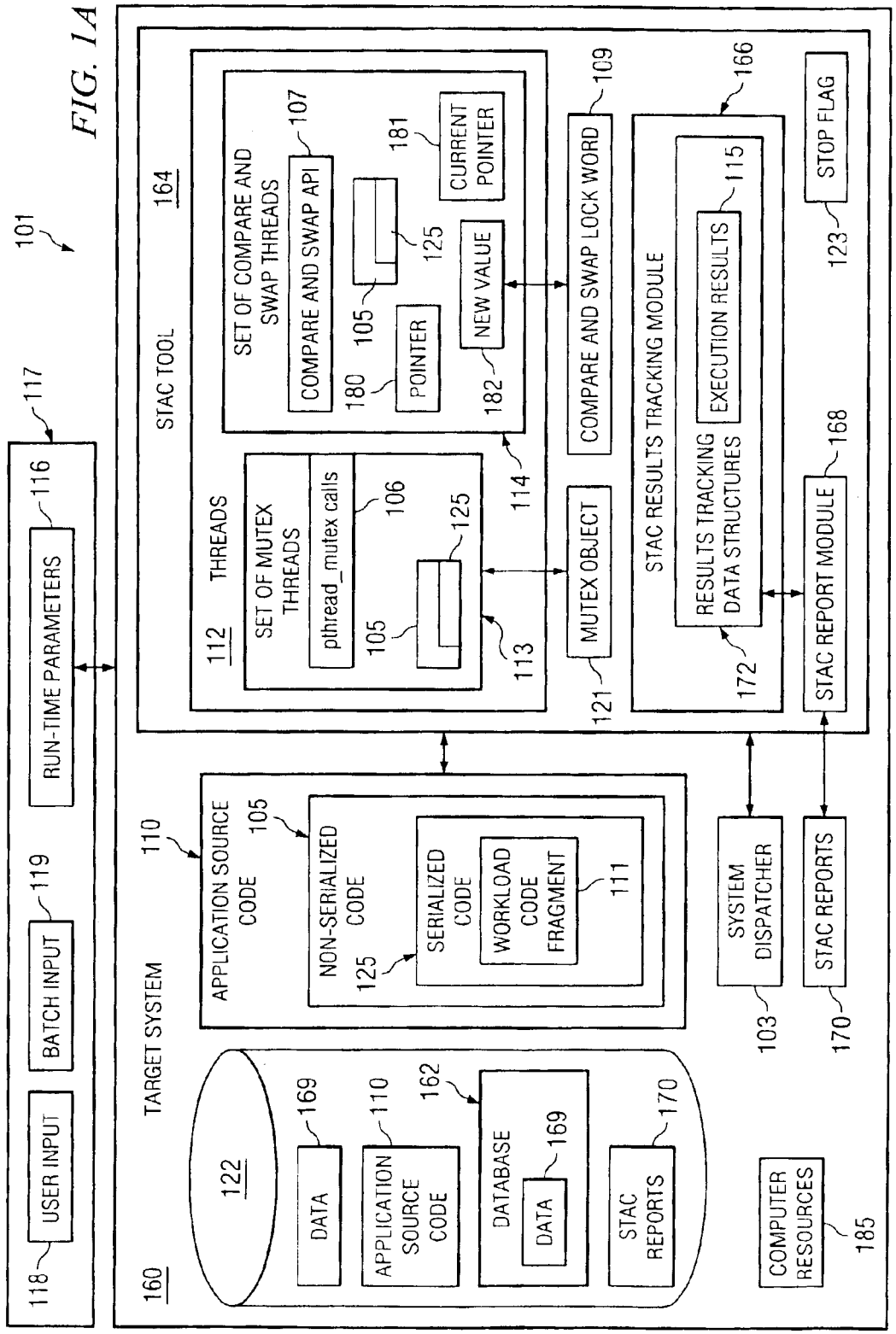
FIG. 1A is a block diagram of the STAC Tool that is an embodiment of the present invention.

FIG. 1 includes FIG. 1A, FIG. 1B, FIG. 1C, FIG. 1D, FIG. 1E, and FIG. 1F. As shown in FIG. 1A and in element 101, the preferred embodiment of the present invention may operate in a target computer system configuration, such as the IBM S/390® that includes the OS/390 operating system, the z/OS UNIX operating system, the UNIX System Services for the IBM OS/390® (OS/390 UNIX). It will be appreciated that other computer system environments may be used to practice the present invention and the described computer system environment should not be considered limiting. For example, either a client computer system or a server computer system within a networked client-server environment may operate in an embodiment of the present invention. The STAC Tool 164 operates in the target computer system 160 to perform the preferred embodiment of the present invention.

Information may be communicated to the STAC Tool 164 via the user interface 117. Through such communication, input parameters 116 may be specified for execution of the STAC Tool 164 and for analysis of the results of the execution of threads 112, such as sets of mutex threads 113 and Compare and Swap threads 114. The user interface 117 may communicate with the preferred embodiment of the present invention, either via batch input 119 or user input 118.

The computer system, embodied in the present example as a target computer system 160 may include computer resources 185. By means of example such computer resources 185 may include, computer processor 355 execution time, counters, queues, program code, memory, data structures, and files. Element 355 is described with reference to FIG. 3.

Further, the STAC Tool 164 may be configured and stored in the memory 358 of the target computer system 160. Alternatively, the STAC Tool 164 may be configured in computer storage such as that of a disk 122. Data 169 used during the execution of the STAC Tool 164 may be stored on the disk 122. The high-performance applications 110 using serialized code 125 may reference data 169 represented in a database 162. Application code 110 may be stored as source code on a disk 112 or other data storage device. Element 358 is described with reference to FIG. 3.

The user of the STAC Tool 164 incorporates a workload code fragment 111 that is extracted from application source code 110, into the STAC Tool 164 program code and then compiles and links the STAC Tool 164. The workload code fragment 111 is a type of serialized code 125, and serialized code 125 is included in the broader category of non-serialized code 105. Serialized code 125 is typically used to access data 169 so that certain data access operations are performed before others are subsequently performed and in the preferred embodiment of the present invention is included in threads 112, and in application code 110.

By iteratively invoking the STAC Tool 164 the results 115 obtained during its execution may be examined so that it may be determined whether use of the pthread_mutex calls 106 or the Compare and Swap API 107 would be most efficient. The Compare and Swap API 107 uses values 131, such as an old pointer 180, a current pointer 181, and a new value 182. The Compare and Swap API 107 compares values 131 stored at the location of both the old pointer 180 and the current pointer 181. If the new value 182 associated with the current pointer 181 is the same as the value 131 in the location associated with the old pointer 180, then the value 131 in the location associated with the old pointer 180 is replaced by the new value 182. Those skilled in the art will appreciate the use of pointers that identify the location of computer data 169. Element 131 is described with reference to FIG. 1D.

Upon examination of the execution results 115, run-time parameters 116 associated with the execution of the STAC Tool 164 may be defined, and subsequently changed during iterative execution of the STAC Tool 164. Run-time parameters 116 are further described with reference to FIG. 2D. During the execution of the STAC Tool 164 the STAC Results Tracking Module 166 is executed and results tracking data structures 172 are propagated with execution results 115. The results tracking data structures 172 are described in detail with reference to FIG. 1C.

The STAC Tool 164 analyzes the results of its execution and may generate STAC reports 170 via the use of the STAC report module 168. The STAC Reports 170 may be stored in computer storage, such as a disk 122, or in the STAC Tool 164 that operates during execution of the computer system 300. Element 300 is described with reference to FIG. 3.

The analysis of the results 115 of the execution of the STAC Tool 164 includes determining the amount of computer processor 355 execution time, a computer resource 185, and that is required to execute a workload code fragment 111. The workload code fragment 111 is computer program code that is representative of the ported code that is to be serialized by pthread_mutex calls 106 or the Compare and Swap API 107. In the preferred embodiment of the present invention the computer processor 355 time required to execute both a set of mutex threads 113 and a set of Compare and Swap threads 114 is determined. Therefore, the execution time of the computer processor 355 that is associated with the pthread_mutex threads 113 may be described as "mutex execution time," and the execution time of the computer processor 355 that is associated with the Compare and Swap threads 114 may be described as "Compare and Swap execution time." The set of mutex threads 113 is a serialized computer resource 185 and includes pthread_mutex calls 106 that, among other elements, contain the location of mutex objects 121. Mutex objects 121 provide a locking mechanism that is typically used by a computer operating system to synchronize execution between simultaneously executing mutex threads 113.

The set of Compare and Swap threads 114 includes a Compare and Swap API 107 that is used by the present invention to simulate the operation of a mutex object 121. Therefore, the preferred embodiment of the present invention uses a Compare and Swap lock word 109 to synchronize execution between simultaneously executing threads 112, which contain the serialized workload code fragment 11.

During the determination of the computer execution time, program control is given to the system dispatcher 103 for a short time to allow the operating system to update the computer processor 355 execution time associated with a particular thread 112. Those skilled in the art will appreciate the use of a system dispatcher 103. A stop flag 123 is set typically in the main( ) routine (as described with reference to FIG. 2C) and is used to terminate execution of the threads 112 containing the workload code fragment 111 as appropriate.

The STAC Reports 170 may include values 131 that are comparison results 115, such as a set of mutex thread statistics and a set of Compare and Swap thread statistics that are compared by the STAC Tool 164 to determine whether serialized application code 125 should be executed using the pthread_mutex calls 106 or the Compare and Swap API 107.

FIG. 1B is a block diagram that illustrates set of mutex threads 113. A thread 112 may be discussed herein with respect to one, or a series of, serialized operations. For example, a mutex serialized operation, such as the pthread_mutex call 106, or a Compare and Swap serialized operation, such as the Compare and Swap API 107, may be replicated during the operation of the present invention. By means of example, the threads 112 may include a plurality of non-serialized code 105. Also, the non-serialized code 105 many include a plurality of serialized code 125. The preferred embodiment of the present invention enables determination of whether execution of each instance of serialized program code 125 would be more efficient by the use of the Compare and Swap API 107 or the pthread_mutex calls 106. Further, at least one workload code fragment 111 is novelly used by the preferred embodiment of the present invention as a sample of the serialized program code 125 to determine whether the serialized program code 125 would be more efficiently executed by the use of the Compare and Swap API 107. Elements 106, 107, 111, and 112 are described with reference to FIG. 1A.

Figure 1C:
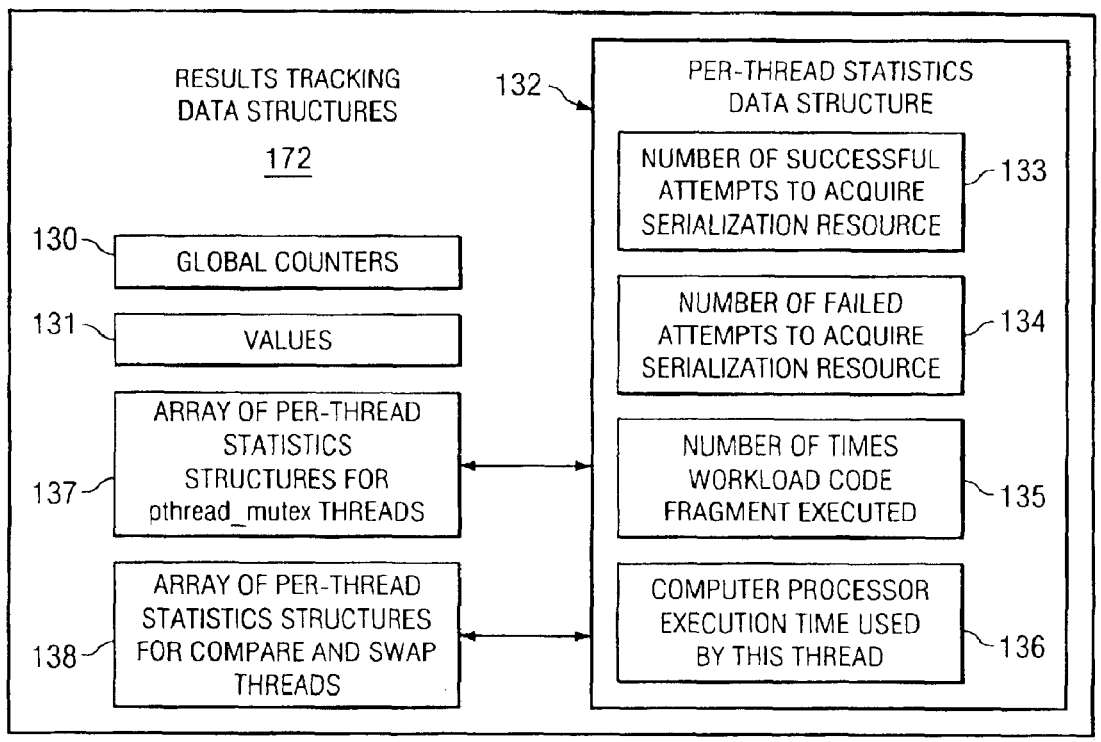
FIG. 1C is a block diagram of the results tracking data structures.

FIG. 1C illustrates in detail the results tracking data structures 172 that are propagated with data 169 that results from executing the threads 112 containing the workload code fragment 111, first in a set of threads 113 that use pthread_mutex serialization control, and then in a set of threads 114 that use Compare and Swap serialization control. Global counters 130 and values 131 are included in the results tracking data structures 172. Element 130 is described in detail with respect to FIG. 1C, and element 131 is described in detail with respect to FIG. 1D. Elements 111, 112, 113, 114, and 169 are described with reference to FIG. 1A.

In the preferred embodiment of the present invention an array of per-thread statistics structures for pthread_mutex threads 137 is provided in the results tracking data structures 172. Also, an array of per-thread statistics structures for Compare and Swap threads 138 is provided in the results tracking data structures 172. These arrays are used to store statistics that are gathered during the execution of the STAC Tool 164 and in the preferred embodiment of the present invention the arrays are populated with data 169 from the per-thread statistics data structure 132. Element 164 is described with reference to FIG. 1A.

The per-thread statistics data structure 132 contains data 169 that is gathered during the execution of the STAC Tool 164, including: the number of successful attempts to acquire serialization resources that are computer resources 185, as shown in element 133, the number of failed attempts to acquire serialization resources 134, the number of times a workload code fragment 111 is executed 135, and the computer processor 355 execution time used by this thread 136. Element 185 is described with reference to FIG. 1A, and element 355 is described with reference to FIG. 3.

Figure 1D:
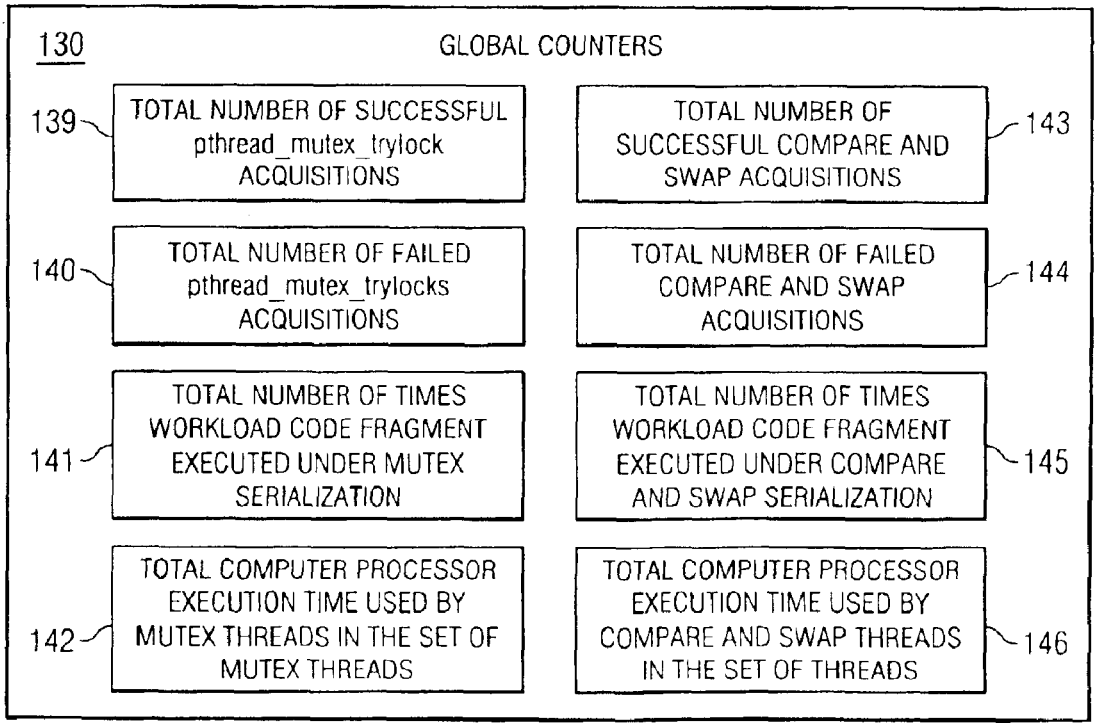
FIG. 1D is a block diagram of the global counters.

FIG. 1D illustrates in detail the global counters 130. More particularly and in the preferred embodiment of the present invention, the global counters 130 include: the total number of successful pthread_mutex_trylock acquisitions 139, the total number of failed pthread_mutex_trylock acquisitions 140, the total number of times the workload code fragment 111 is executed under mutex serialization 141, and the total computer processor 355 execution time used by the mutex threads 113 in the set of mutex threads as shown in element 142. Also, the global counters 130 include: the total number of successful Compare and Swap lock word 109 acquisitions as shown in element 143, the total number of failed Compare and Swap lock word 109 acquisitions as shown in element 144, the number of times the workload code fragment 111 is executed under Compare and Swap serialization as shown in element 145, and the total computer processor 355 execution time used by the Compare and Swap threads in the set of threads 146. Elements 109, 111, and 113 are described with reference to FIG. 1A, and element 355 is described with reference to FIG. 3.

FIG. 1E illustrates in detail the values 131 that are the comparison results 115 and that are used by the preferred embodiment of the present invention to determine when the use of the Compare and Swap API 107 is more efficient than the pthread_mutex calls 106. More particularly, values 131 include: the average computer execution time for a successful mutex thread execution cycle 147, the average computer execution time for a successful Compare and Swap thread execution cycle 148, the ratio of mutex serialized workload code fragment computer processor execution time to computer processor execution time for the non-serialized code within which the serialized workload code fragment executes 149, the ratio of Compare and Swap serialized code computer execution time to computer execution time for the non-serialized code within which the serialized code executes 150, and as shown in element 151 the ratio of the number of workload code fragments 111 executed with the set of mutex threads 113 to the number of workload code fragments 111 executed with the set of Compare and Swap threads 114. The values 131 are derived from information obtained in the global counters 130 and in the per-thread statistics data structure 132. Elements 105, 106, 107, 111, and 115 are described with reference to FIG. 1A.

FIG. 1F is a block diagram of a sample report 170. It will be appreciated that other forms of a report 170 may be employed by other embodiments of the present invention without departing from the spirit of the present invention. Therefore, as shown in the sample report 170 a mutex threads summary 2209 is presented. The runtime parameters 116 are listed, and the operation of setting default values 131 is described with reference of FIG. 2D. The values 131 are listed including: the average computer execution time for a successful mutex thread execution cycle 147, the average computer execution time for a successful Compare and Swap thread execution cycle 148, and as shown in element 151 the ratio of the number of workload code fragments 111 executed with the set of mutex threads 113 to the number of workload code fragments 111 executed with the set of Compare and Swap threads 114. Elements 111, 113, and 114 are described with reference to FIG. 1A.

The global counters 130 are also listed, including: the total number of successful pthread_mutex_trylock acquisitions 139, the total number of times the workload code fragment 111 is executed under mutex serialization 141, and the total computer processor 355 execution time used by the mutex threads 113 in the set of mutex threads as shown in element 142, the total number of successful Compare and Swap lock word 109 acquisitions as shown in element 143, the number of times the workload code fragment 111 is executed under Compare and Swap serialization as shown in element 145, and the total computer processor 355 execution time used by the Compare and Swap threads in the set of threads as shown in element 146. Elements 109, 130 and 131 are described with reference to FIG. 1D, and element 355 is described with reference to FIG. 3.

Figure 21:
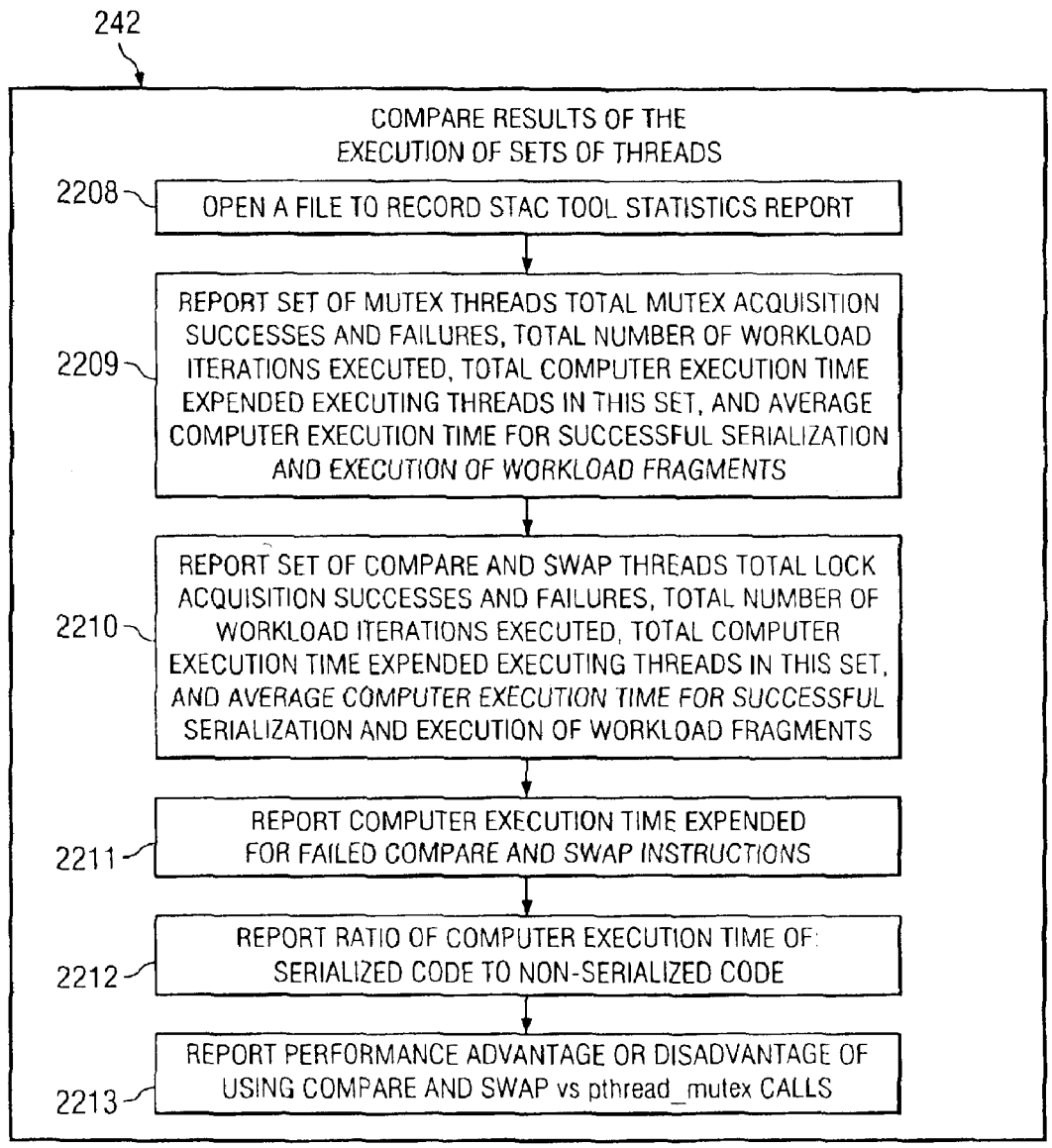

Also the report 170 includes a summary 2210 used to compare the efficiency of the computer processor 355 execution time used by the set of Compare and Swap threads 114 to the computer processor 355 execution time used by the set of mutex threads 113. Further, the report 170 includes the computer processor 355 execution time expended for failed Compare and Swap instructions 191 that is also discussed with reference to FIG. 21 and element 2211. The report 170 includes the performance advantage or disadvantage of using the Compare and Swap API versus pthread_mutex calls 190 that is also discussed with reference to FIG. 21 and element 2213.

Figures 2, 2A:
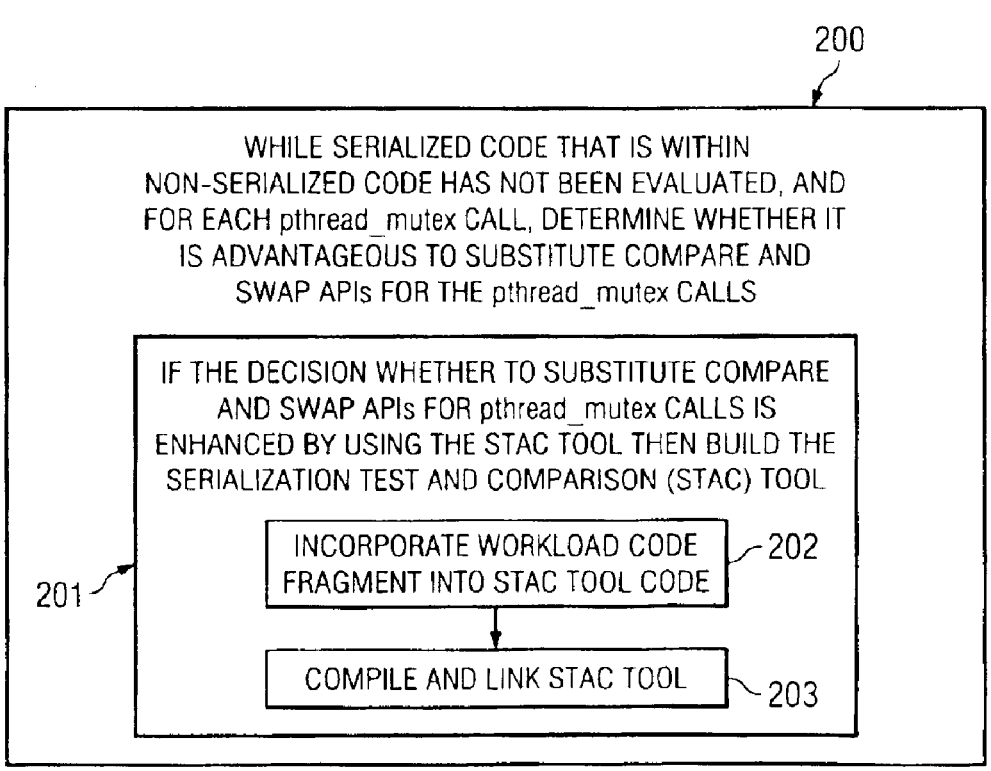
FIG. 2 includes FIG. 2A, FIG. 2B, FIG. 2C, FIG. 2D, FIG. 2E, FIG. 2F, FIG. 2G, FIG. 2H, and FIG. 2I.
FIG. 2A is a flow diagram that illustrates building the STAC Tool.

FIG. 2 includes FIG. 2A, FIG. 2B, FIG. 2C, FIG. 2D, FIG. 2E, FIG. 2F, FIG. 2G, FIG. 2H, and FIG. 2I. FIG. 2A and element 200 illustrate the preferred method of the present invention that builds the STAC Tool 164. The preferred embodiment of the present invention advantageously determines whether the Compare and Swap API 107 would improve performance of serialized code 125, such as the workload code fragment 111 that has been ported from other computer systems to the OS/390 UNIX system. As shown in element 200, the preferred embodiment of the present invention operates while serialized program code 125 that is within non-serialized program code 105 has not been evaluated, and for each pthread_mutex call 106 it is determined whether it is advantageous to substitute Compare and Swap APIs 107 for the pthread_mutex calls 106. It will be appreciated that some program code is, by human user examination, determined to operate most efficiently by use of the pthread_mutex calls 106. However, in many instances human user examination is not sufficient for such a determination. Therefore, if the decision whether to substitute Compare and Swap APIs 107 for pthread_mutex calls 106 is enhanced by using the Serialization Test and Comparison (STAC) Tool 164, then the preferred embodiment of the present invention builds the STAC Tool 164. More particularly and as shown in element 202 at least one workload code fragment 111 is incorporated into the STAC Tool 164, and the STAC Tool 164 is compiled and linked, as shown in element 203. Elements 105, 106, 107, 111, 125, and 164 are described with reference to FIG. 1.

Figure 2B:
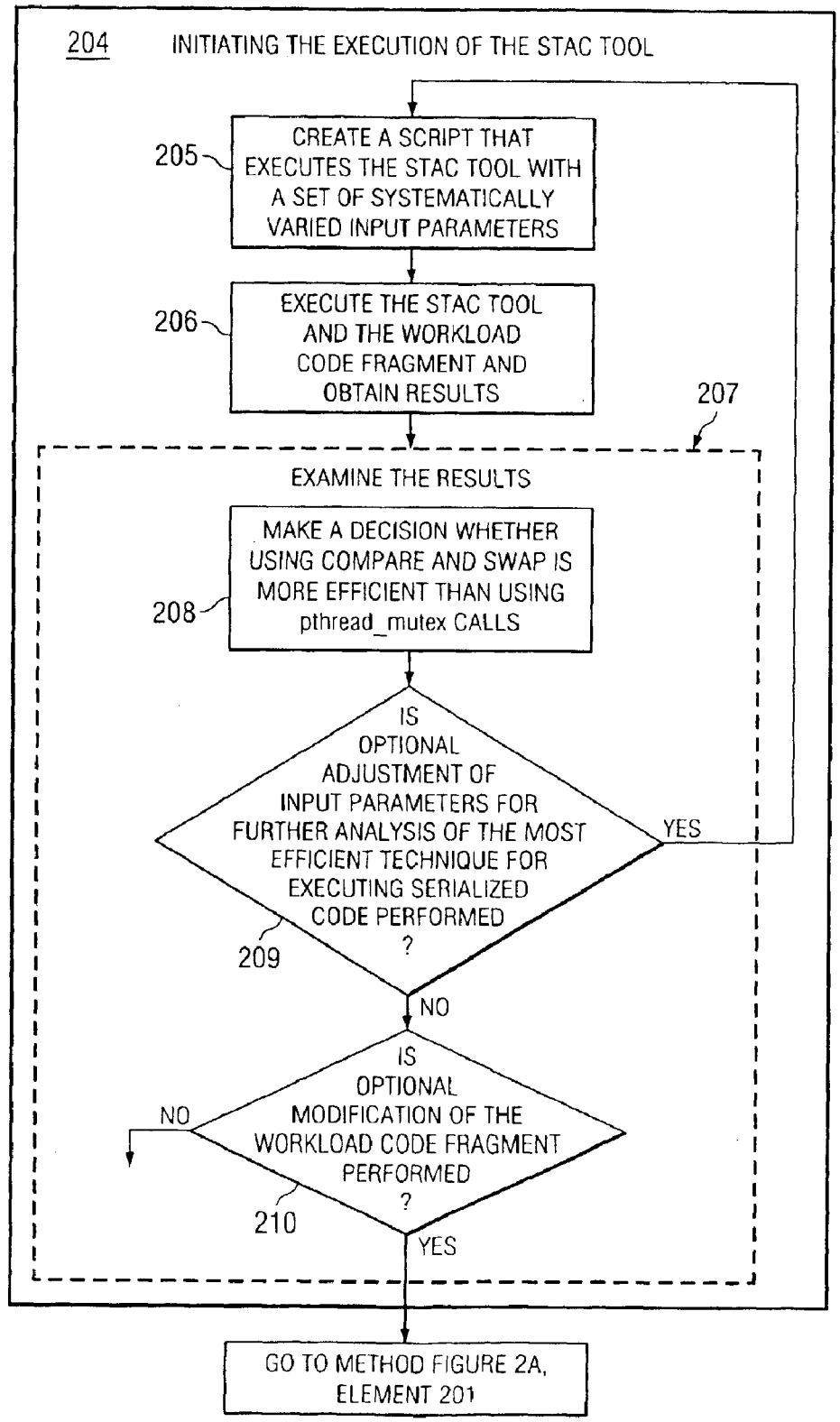
FIG. 2B is a flow diagram that illustrates initiating the execution of the STAC Tool.

FIG. 2B and element 204 illustrate initiating the execution of the STAC Tool 164, which is performed according to the preferred embodiment of the present invention after the STAC Tool is built 201 (as shown in FIG. 2A). The execution of the STAC Tool 164 may include iterative examination of the results 115 of prior execution of the STAC Tool 164 with a workload code fragment 111, and subsequent adjustment of input parameters 116 used during execution of the STAC Tool 164. More particularly, and according to the preferred embodiment of the present invention, initiating the execution of the STAC Tool 204 includes: creating a script that executes the STAC Tool 164 with a set of systematically varied input parameters 116, as shown in element 205; executing the STAC Tool 164 and the workload code fragment 111 and obtaining results 115, as shown in element 206; and examining the results 115, as shown in element 207. Systematically changing the input parameters 116 enables analysis of a variety of program code scenarios so that it may be determined if serialized application code 110 will be more efficiently executed using the Compare and Swap API 107 or pthread_mutex calls 106. Elements 107, 110, 111, 115, 116, and 164 are described with reference to FIG. 1.

Figure 2C:
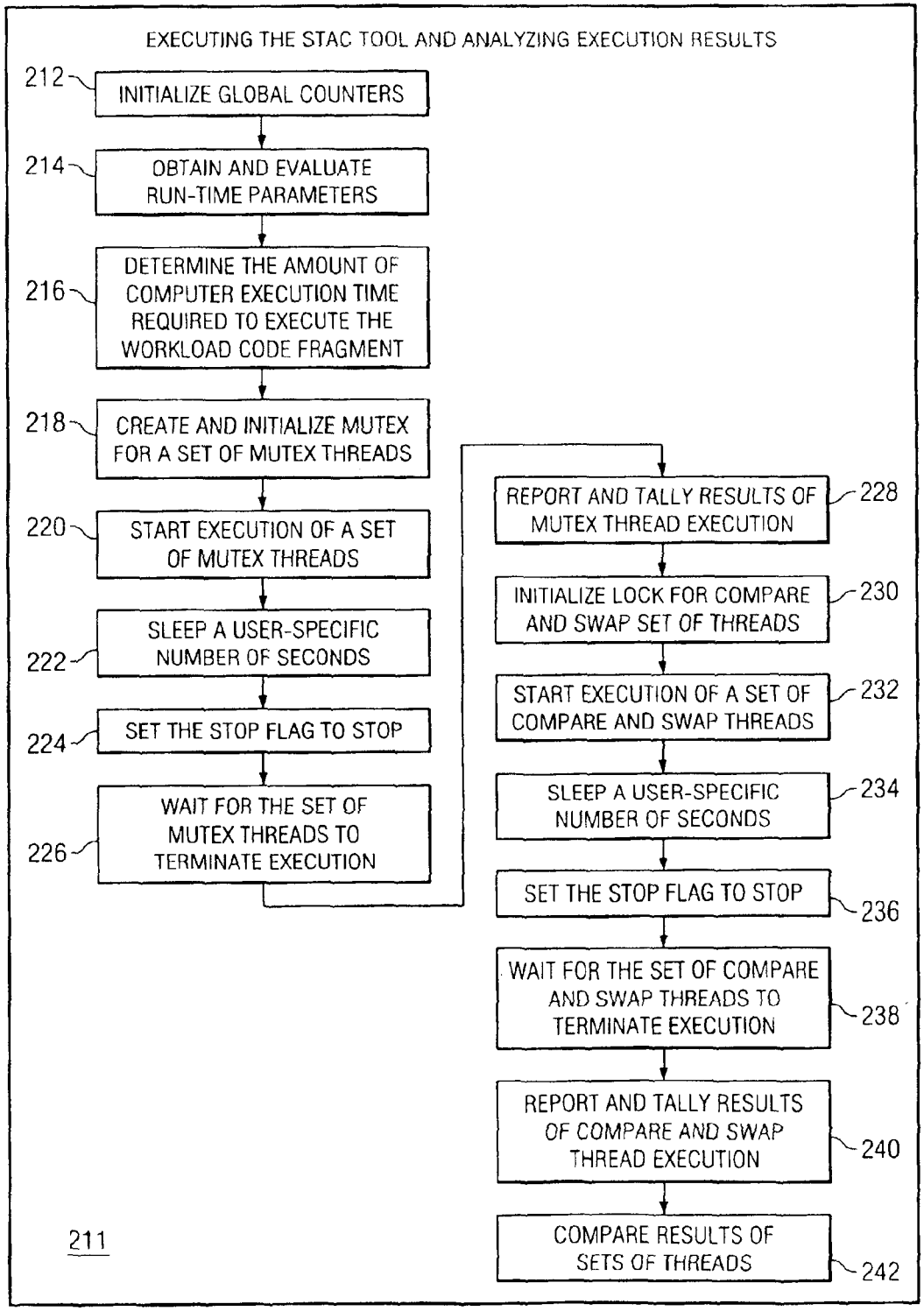
FIG. 2C is a flow diagram that illustrates executing the STAC Tool and analyzing execution results.

The operation of examining the results 207 novelly includes making a decision whether using the Compare and Swap API 107 is more efficient than using pthread_mutex calls 106, as shown in element 208. Optional adjustment of input parameters 116 may be performed if the determination of the test as shown in element 209 is that different input parameter values 116 may be appropriate. Therefore, if the result of the test of element 209 is YES, then the method of the present invention loops back to element 205. If the result of the test of element 209 is NO, then a test as shown in element 210 of whether optional change of the workload code fragment 111 is performed. If the result of the test of element 210 is YES, then the method of the present invention loops back to element 201, as shown in FIG. 2A. If the operations of elements 209 and 210 are bypassed, then the method of the present invention moves to element 211 as shown in FIG. 2C. Element 106 is described with reference to FIG. 1.

FIG. 2C and element 211 illustrate the preferred embodiment of the present invention of executing the main( ) routine of the STAC Tool 164 and analyzing execution results 115. Those skilled in the art will appreciate the use of a main( ) routine in computer program code. The global counters 130 are initialized, as shown in 212. The run-time parameters 116 are obtained and evaluated, as shown in element 214. Element 214 is described in detail with reference to FIG. 2D. The amount of computer processor 355 execution time required to execute the workload code fragment 111 is determined, as shown in element 216. In the preferred embodiment of the present invention operations associated with mutex threads 113 are executed. It will be appreciated that operations associated with the Compare and Swap API 107 could alternatively be executed next without departing from the spirit of the invention. Elements 111, 113, 115, 116, 130, and 164 are described with reference to FIG. 1, and element 355 is described with reference to FIG. 3.

A set of mutex threads 113 are created and initialized, as shown in element 218. The execution of the set of mutex threads 113 is started, as shown in element 220. Element 220 is described in detail with reference to FIG. 2E. A sleep command is executed that includes a specific number of seconds to sleep, as shown in element 222. It will be appreciated that the operation of executing a sleep command to effectively delay execution of another program code command for a specified time period is well known to those skilled in the art. According to the operation of the preferred embodiment of the present invention the main( ) routine of the STAC Tool 164 that invokes the sleep( ) function eventually resumes execution and sets a stop flag 123, as shown in element 224, that terminates the execution of the set of mutex threads 113, as shown in element 226. In the preferred embodiment of the present invention the execution results 115 associated with each thread 112 in the set of mutex threads 113 is tallied and reported, as shown in element 228. Elements 112, 115, 123, and 164 are described with reference to FIG. 1A and element 228 is described in detail with reference to FIG. 2F.

Before the set of Compare and Swap threads 114 is executed, the lock word for the Compare and Swap set of threads 109 is initialized, as shown in element 230. The execution of the set of Compare and Swap threads 114 is started, as shown in element 232. Element 232 is described in detail with reference to FIG. 2G. A sleep command associated with the set of Compare and Swap threads 114 is executed that includes a specific number of seconds to sleep, as shown in element 234. According to the operation of the preferred embodiment of the present invention the main( ) routine of the STAC Tool 164 that invokes the sleep( ) function eventually resumes execution and sets the stop flag 123, as shown in element 236, that terminates the execution of the set of Compare and Swap threads 114, as shown in element 238. In the preferred embodiment of the present invention the execution results 115 associated with each thread 112 in the set of Compare and Swap threads 114 are tallied and reported, as shown in element 240. Finally, the results 115 of the execution of the set of mutex threads 113 and the set of Compare and Swap threads 114 are compared, as shown in element 242. Elements 109, 114 and 123 are described with reference to FIG. 1A, element 240 is described in detail with reference to FIG. 2H, and element 242 is described in detail with reference to FIG. 2I.

Figure 2D:
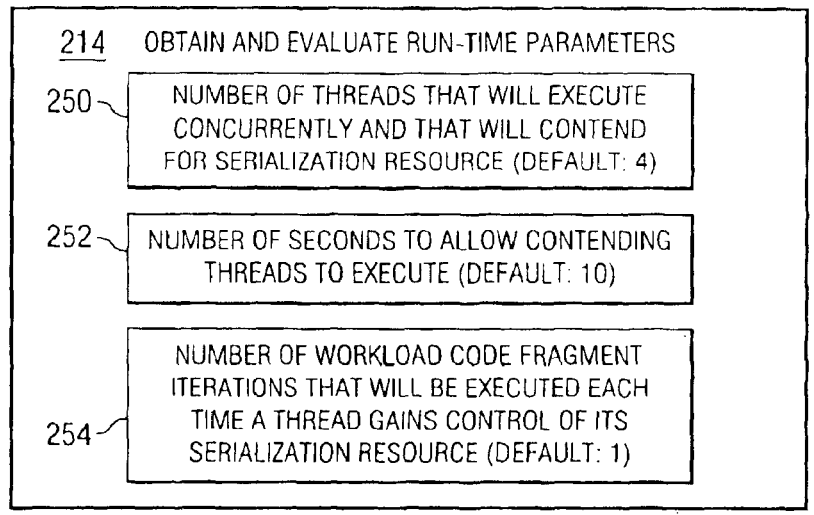
FIG. 2D is a flow diagram that illustrates obtaining and evaluating run-time input parameters.

FIG. 2D and element 214 illustrate the method of obtaining and evaluating runtime parameters 116. The run-time parameters 116 include the number of threads 112 that execute concurrently and that will contend for serialization resources that are computer resources 185, as shown in element 250. In the preferred embodiment of the present invention the default value for element 250 is four. Also the run-time parameters include the number of seconds to allow contending threads 112 to execute, as shown in element 252. In the preferred embodiment of the present invention the default value for element 252 is ten. Finally, the run-time parameters include the number of workload code fragment 111 iterations that will be executed each time a thread 112 gains control of its serialization resource, as shown in element 254. In the preferred embodiment of the present invention the default value for element 254 is one. Elements 111, 112, 116, and 185 are described with reference to FIG. 1A.

Figure 2F:
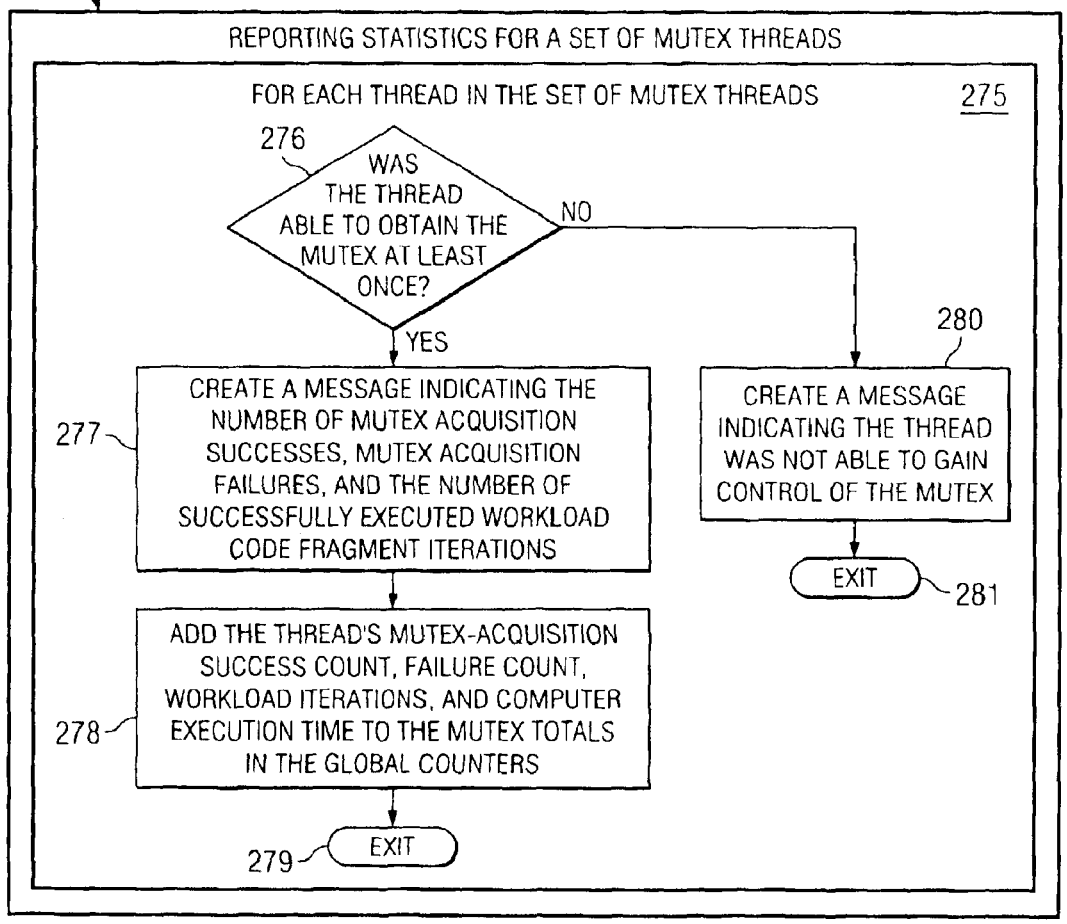
FIG. 2F is a flow diagram that illustrates reporting statistics for a set of mutex threads.
Figure 2E:
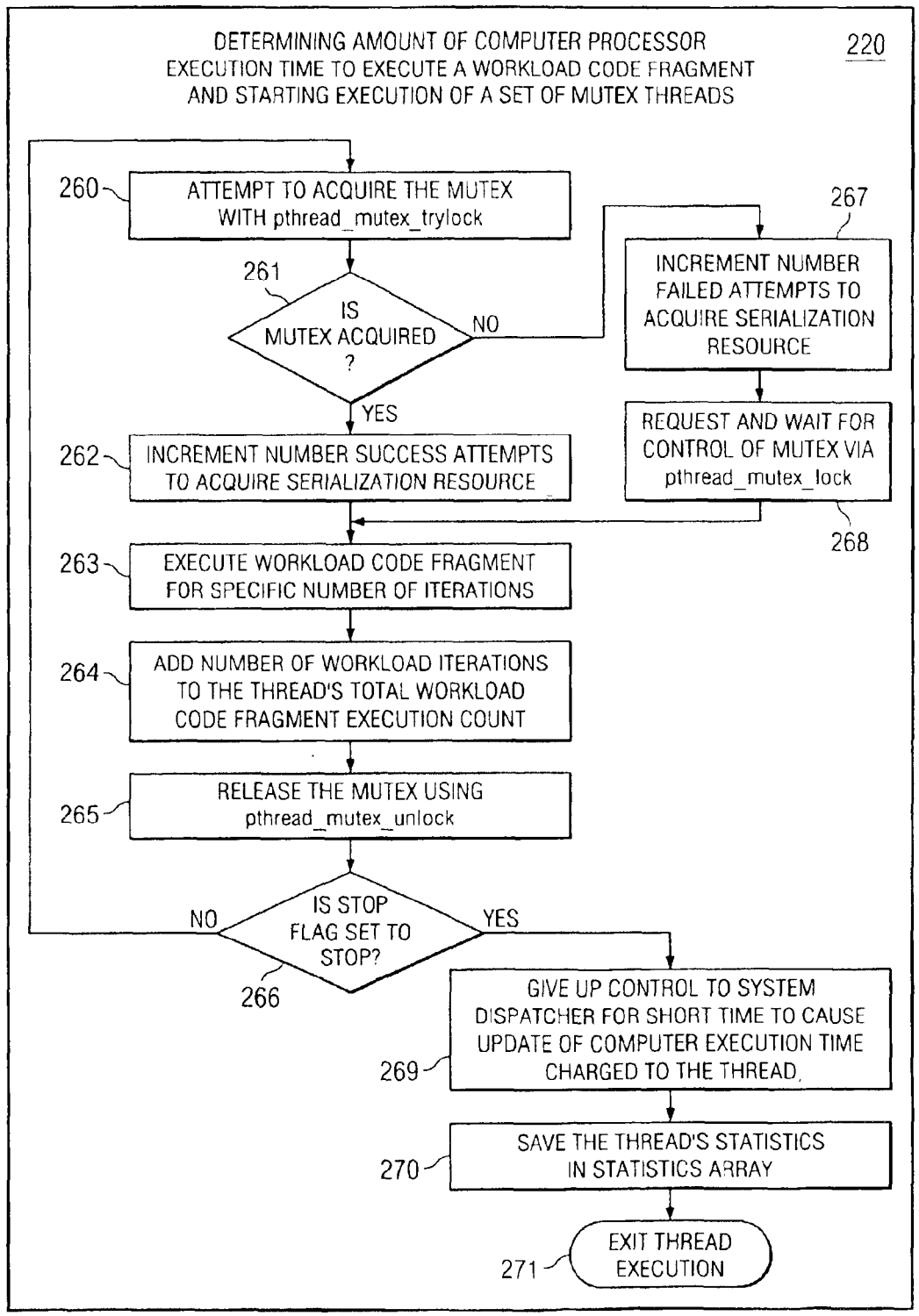
FIG. 2E is a flow diagram that illustrates determining the amount of time to execute a workload code fragment and starting execution of a set of mutex threads.

FIG. 2E illustrates the method of determining the amount of computer processor 355 time expended to execute a workload code fragment 111 and starting the execution of a set of mutex threads 113, as shown in element 220. Initially and in the preferred embodiment of the present invention, there is an attempt to acquire the mutex object 121 with a programmatic call to the pthread_mutex_trylock API 106, as shown in element 260. It will be appreciated by those skilled in the art that a mutex object 121 is used to protect shared computer resources 185. A test, as shown in element 261, determines whether the mutex object 121 is acquired. If the mutex object 121 is not acquired then the data structure, "number of failed attempts to acquire serialization resource" 134 is incremented, as shown in element 267. Further as shown in element 268, a request of the pthread_mutex_lock API 106 is issued for control of the mutex object 121, and the program waits for the request to be granted. Then, as shown in element 263, the workload code fragment 111 is executed again. Elements 106, 111, 113, 121, 134, and 185 are described with reference to FIG. 1A, and element 355 is described with reference to FIG. 3.

If the test of element 261 succeeds then the data structure, "number of successful attempts to acquire serialization resource" 133 is incremented, as shown in element 262. The workload code fragment 111 is executed for a specific number of iterations, as shown in element 263. The specific number of iterations may be communicated programmatically, typically via batch input 119, or it may be communicated via user input 118. The number of workload iterations for a particular thread is added to the data structure, "number of times workload code fragment executed" 135, as shown in element 264. The mutex object 121 is released, typically by using the pthread_mutex_unlock call API 106, as shown in element 265. Elements 112, 118, 119, 133, and 135 are described with reference to FIG. 1A.

There is a test to determine whether the stop flag 123 is set, as shown in element 266. Recall that the stop flag 123 is set typically in the main( ) routine of the STAC Tool 164, as shown in element 224 of FIG. 2C. If the stop flag 123 is not set, the preferred embodiment of the present invention loops back to element 260 and attempts to acquire the mutex object 121. Alternatively, if the result of the test of element 266 is YES then execution control is given to the system dispatcher 103 for a short time to cause an update of the computer processor 355 execution time charged to the thread 136, as shown in element 269. The operation of the system dispatcher 103 will be appreciated by those skilled in the art. Then the per-thread statistics 132 are saved in a statistics array, as shown in element 270. In the preferred embodiment of the present invention, the statistics array for this technique is the array of per-thread statistics structures for pthread_mutex threads, as shown in element 137 of FIG. 1C. Then the execution of the mutex thread 113 is exited, as shown in element 271. Elements 103, 113, 123, 132, 136, and 164 are described with reference to FIG. 1.

FIG. 2F illustrates the method of reporting statistics for a set of mutex threads 113, as shown in element 228. For each thread 112 in the set of mutex threads 13, as shown in element 275, a test determines whether the mutex thread 113 was able to obtain the mutex object 121 at least once, as shown in element 276. If the result of the test of element 276 is NO then a message is created indicating that the mutex thread 113 was not able to gain control of the mutex object 121, as shown in element 280, and the program exits, as shown in element 281. Elements 112, 113 and 121 are described with reference to FIG. 1A.

Alternatively, if the result of the test of element 276 is YES, then a message is created indicating the number of mutex acquisition successes, mutex acquisition failures, and the number of successfully executed workload code fragment iterations, as shown in element 277. Typically, the number of mutex acquisition successes and mutex acquisition failures are determined by use of the pthread_mutex_trylock API 106. Then as shown in element 278, the information acquired in the per-thread statistics data structure 132 that was stored in the array of per-thread statistics structure for pthread_mutex threads 137 is added to the mutex totals in the global counters 130. More particularly, the mutex global counters 130 include: the total number of successful pthread_mutex_trylock acquisitions 139, the total number of failed pthread_mutex trylock acquisitions 140, the total number of times the workload code fragment is executed under mutex serialization 141, and the total computer execution time used by mutex threads in the set of mutex threads 142. The program then exits, as shown in element 279. Elements 106, 130, 132, 137, 139, 140, 141, and 142 are described with reference to FIG. 1.

Figure 2G:
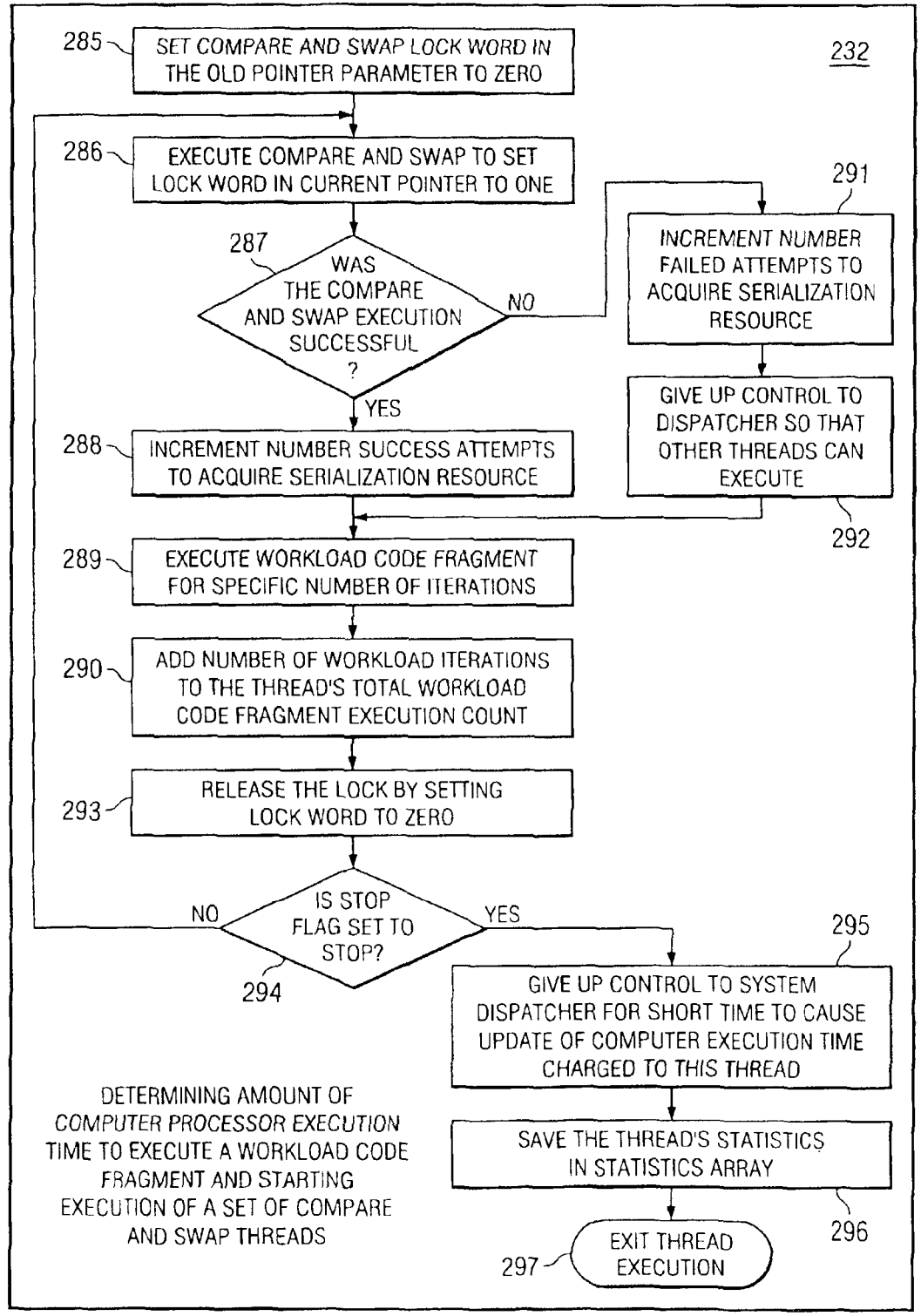
FIG. 2G is a flow diagram that illustrates determining the amount of time to execute a workload code fragment and starting execution of a set of Compare and Swap threads.

FIG. 2G illustrates the novel method of determining the amount of computer processor 355 time expended to execute a workload code fragment 111 and starting execution of a set of Compare and Swap threads 114, as shown in element 232. Initially and in the preferred embodiment of the present invention, the current value 131 in the Compare and Swap lock word 109 in the old pointer parameter 180 is set to zero, as shown in element 285. In the preferred embodiment of the present invention, then the program executes and the new value 182 in the Compare and Swap lock word 109 in the current pointer 181 is set to one, as shown in element 286. It will be appreciated that any value 131 may be used as a flag to determine whether execution of the Compare and Swap thread 114 was successful. A test, as shown in element 287, determines whether execution of the Compare and Swap thread 114 was successful. If it is not successful the data structure, "number of failed attempts to acquire serialization resource" 134 is incremented, as shown in element 291. Further as shown in element 292 control is given up to the system dispatcher 103 so that other threads 112 can execute. Then, as shown in element 289, the workload code fragment 111 is executed again. Elements 103, 109, 111, 112, 114, 134, 180, 181, and 182 are described with reference to FIG. 1, and element 355 is described with reference to FIG. 3.

If the test of element 287 succeeds then the data structure, "number of successful attempts to acquire serialization resource" 133 is incremented, as shown in element 288. The workload code fragment 111 is executed for a specific number of iterations, as shown in element 289. The number of workload iterations is added to the data structure, "number of times workload code fragment executed" 135 for a particular thread 112, as shown in element 290. The lock word 109 is released, typically by setting the lock word 109 to zero, as shown in element 293. It will be appreciated that any value 131 may be used as a flag to identify that the lock word 109 is released. Element 133 is described with reference to FIG. 1.

There is a test to determine whether the stop flag 123 is set, as shown in element 294. Recall that the stop flag 123 is set, as shown in element 236 of FIG. 2C. If the stop flag 123 was not set, the preferred embodiment of the present invention loops back to element 286 and attempts to execute. Alternatively, if the result of the test of element 294 is YES then execution control is given to the system dispatcher 103 for a short time to cause an update of the computer processor 355 execution time charged to the thread 136, as shown in element 295. Then the statistics associated with this thread 132 are saved in a statistics array, as shown in element 296. In the preferred embodiment of the present invention, the statistics array for this technique is the array of per-thread statistics structures for Compare and Swap threads, as shown in element 138 of FIG. 1C. Then the execution for the thread 112 is exited, as shown in element 297. Elements 123, 132, 136, and 138 are described with reference to FIG. 1B.

Figure 2H:
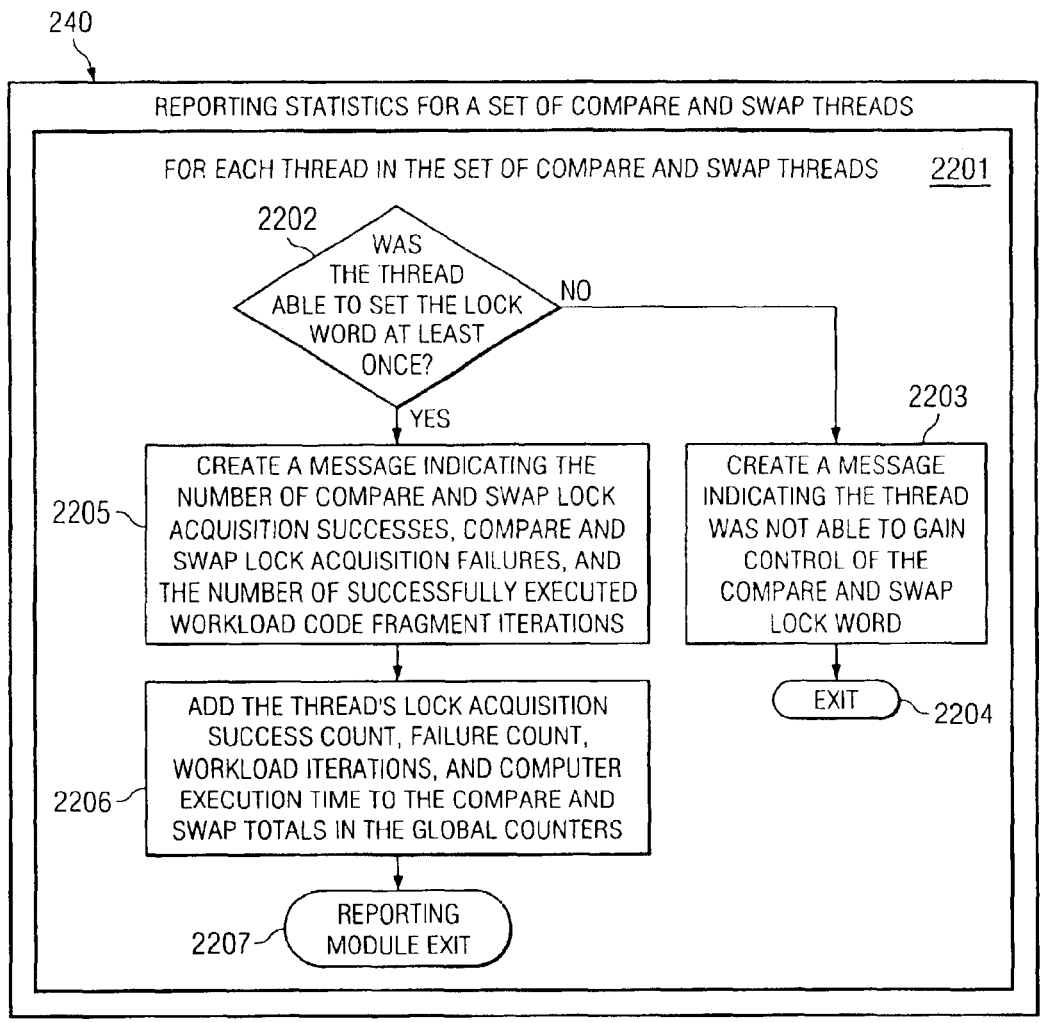
FIG. 2H is a flow diagram that illustrates reporting statistics for a set of Compare and Swap threads.

FIG. 2H illustrates the method of reporting statistics for a set of Compare and Swap threads 114, as shown in element 240. For each thread 112 in the set of Compare and Swap threads 114, as shown in element 2201 a test determines whether the Compare and Swap thread 114 was able to set the lock word 109 at least once, as shown in element 2202. If the result of the test of element 2202 is NO then a message is created indicating that the Compare and Swap thread 114 was not able to gain control of the lock word 109, as shown in element 2203, and the program exits, as shown in element 2204. Elements 109, 112 and 114 are described with reference to FIG. 1A.

Alternatively, if the result of the test of element 2202 is YES, then a message is written to the STAC Report 170 indicating the number of Compare and Swap lock word 109 acquisition successes, lock word 109 acquisition failures, and the number of successfully executed workload code fragment 111 iterations, as shown in element 2205. Then as shown in element 2206, the information acquired in the per-thread statistics data structure 132 that was stored in the array of per-thread statistics data structure for Compare and Swap threads 138 is added to the Compare and Swap totals in the global counters 130. More particularly, the Compare and Swap global counters 130 include: the total number of successful Compare and Swap instructions 143, the total number of failed Compare and Swap instructions 144, the total number of times the workload code fragment is executed under Compare and Swap serialization 145, and the total computer processor 355 execution time used by Compare and Swap threads in the set of Compare and Swap threads 146. The reporting module execution for the current thread 112 then exits, as shown in element 2207. Elements 111, 130, 132, 138, 143, 144, 145, 146, and 170 are described with reference to FIG. 1.

FIG. 2I illustrates the novel method of comparing the results of the execution of sets of threads 115, as shown in element 242. In the preferred embodiment of the present invention, a file is opened to record the STAC Tool statistics report 170, as shown in element 2208. Information included in the global counters 130 and the values 131 is used to create a STAC report 170. The STAC report 170 includes information about the set of mutex threads 113 total mutex acquisition successes and failures, the total number of workload code fragment 111 iterations executed, the total computer execution time expended executing threads in this set, and the average computer processor 355 execution time for successful serialization and execution of workload code fragments 111 is generated, as shown in element 2209. A report 170 of the set of Compare and Swap threads 114 total lock word 109 acquisition successes and failures, the total number of workload code fragment 111 iterations executed, the total computer processor 355 execution time expended executing threads 112 in this set, and the average computer execution time for successful serialization and execution of workload code fragments 111 is generated, as shown in element 2210. Also a report of the computer execution time expended for failed Compare and Swap instructions 191 is generated, as shown in element 2211. A report 170 of the ratio of computer execution time of serialized code 125 to non-serialized code 105 is generated, as shown in element 2212. Elements 149 and 150, as shown in FIG. 1E, are used to generate the report 170 described in element 2212. Finally, a report of the performance advantage or disadvantage of using the Compare and Swap API versus pthread_mutex calls 190 is generated, as shown in element 2213. Elements 105, 106, 107, 109, 111, 112, 113, 114, 115, 125, 130, 131, 170, 190, and 191 are described with reference to FIG. 1, and element 355 is described with reference to FIG. 3.

Figure 3:
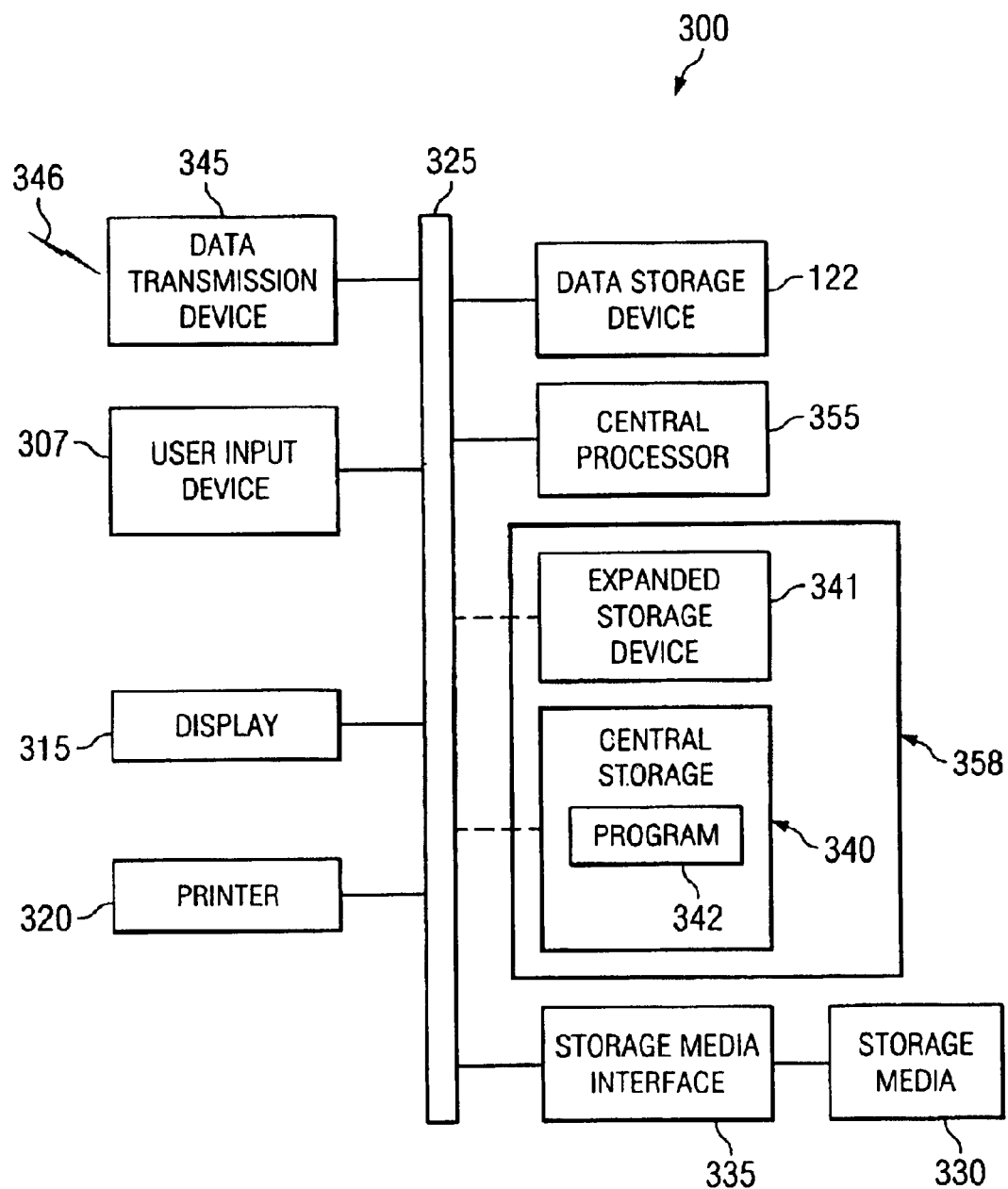
FIG. 3 is a block diagram of a computer system suitably configured for employment of the present invention.

FIG. 3 is a block diagram of an exemplary computer system 300, suitable for employment of the present invention. The computer system 300 may be implemented on a general-purpose computer, such as the IBM S/390®, or other conventional minicomputer, workstation, or graphics computer device. In its preferred embodiment, the computer system 300 includes a user-input device 307, a display 315, a printer 320, a central processor 355, a memory 358, a data storage device 122, such as a hard drive, an expanded storage device 341, a central storage 340, a storage media 330, a storage media interface 335, and a data transmission device 345, all of which are coupled to a bus 325 or other communication means for communicating information. The central storage 340 is directly addressable by the central processor 355. The expanded storage 341 may be used to relieve the central storage 340 when it is heavily utilized. Although the system 300 is represented herein as a standalone system, it is not limited to such, but instead can be part of a networked system. For example, the exemplary computer system 300 may be connected locally or remotely to fixed or removable data storage devices 122 and data transmission devices 345 by networking connections 346. For another example, the exemplary computer system 300, such as the target computer system 160 (as shown in FIG. 1A) also could be connected to each other and to other computer systems via the data transmission device 345 and the networking connections 346.

The central storage 340, the expanded storage 341, and the data storage device 122 are storage components that store data 169 (as shown in FIG. 1A) and instructions for controlling the operation of the central processor 355, which may be configured as a single processor or as a plurality of processors. The central processor 355 executes a program 342 to perform the methods of the present invention, as described herein. Before processing occurs, a program 342 and its data 169 must reside in central storage 340. Input/Output operations result in the transfer of information between the central storage 340 and the user-input device 307.

While the program 342 is indicated as loaded into the memory 348, it may be configured on storage media 330 for subsequent loading into the data storage device 122 or the memory 358 via an appropriate storage media interface 335. Storage media 330 can be any conventional storage media such as a magnetic tape or an optical storage media. Alternatively, storage media 330 can be another type of electronic storage, located on a remote storage system.

Generally, the computer programs 342 and operating systems are all tangibly embodied in a computer-readable device or media, such as the memory 358, the data storage device 122, or the data transmission devices 345, thereby making an article of manufacture, such as a computer program product, according to the invention. As such, the terms "computer program product" as used herein are intended to encompass a computer program accessible from any computer-readable device or media.

Moreover, the computer programs 342 and operating systems are comprised of instructions which, when read and executed by the exemplary computer system 300, such as the target computer system 160, perform the steps necessary to implement and use the present invention. Under control of the operating system, the computer programs 342 may be loaded from the memory 358, the data storage device 122, or the data transmission devices 345 and networking connections 346 into the memory 358 of the exemplary computer system 300, such as the target computer system 160.

The user-input device 307 is a device, such as a keyboard or speech recognition subsystem, for enabling a user to communicate information and command selections to the central processor 355. The user can observe information generated by the system 300 via the display 315 or the printer 320. The user-input device 307 may also be a mouse, track-ball, or joy stick that allows the user to manipulate a cursor on the display 315 for communicating additional information and command selections to the central processor 355.

When operating in accordance with one embodiment of the present invention, the exemplary computer system 300 determines when use of the Compare and Swap API 107 would improve performance of serialized code 125 that has been ported from other computer systems to the OS/390 UNIX system. The central processor 355 and the program 342 collectively operate to implement an embodiment of the present invention. It will be appreciated that the present invention offers many advantages over prior art techniques. Elements 107 and 125 are described with reference to FIG. 1A.

The present invention is typically implemented using one or more computer programs, each of which executes under the control of an operating system and causes the exemplary computer system 300, such as the target computer system 160, to perform the desired functions as described herein. Thus, using the present specification, the invention may be implemented as a machine, process, method, system, or article of manufacture by using standard programming and engineering techniques to produce software, firmware, hardware or any combination thereof.

It should be understood that various alternatives and modifications may be devised by those skilled in the art. However, these should not be viewed as limitations upon the practice of these teachings, as those skilled in the art, when guided by the foregoing teachings, may derive other suitable characteristics of a similar or different nature. The present invention is intended to embrace all such alternatives, modifications and variances that fall within the scope of the appended claims Trademarks IBM, S/390, OS/390, and z/OS are trademarks or registered trademarks of International Business Machines Corporation in the United States and other countries. UNIX is a trademark or a registered trademark of Unix System Laboratories, Inc.

What is claimed is:

1. A computer-implemented method for determining whether execution of serialization operations of program code is improved by substituting at least one mutex serialized operation on said computer with at least one Compare and Swap serialized operation on said computer, said program code including at least one workload code fragment that is serialized said program code, said method comprising:

executing said at least one workload code fragment with said at least one mutex serialized operation while tracking mutex execution time;

executing said at least one workload code fragment with said at least one Compare and Swap serialized operation while tracking Compare and Swap execution time;

comparing said mutex execution time to said Compare and Swap execution time; and determining from said comparison of mutex execution time to Compare and Swap execution time whether said execution of serialization operations of program code is improved by substituting said at least one mutex serialized operation with said at least one Compare and Swap serialized operation.

2. The method of claim 1, further comprising porting said program code from a UNIX computer system to said computer that includes OS/390 UNIX.

3. The method of claim 1, further comprising:
storing said mutex execution time; and
storing said Compare and Swap execution time.

4. The method of claim 1, further comprising determining when execution of said serialization operations of said program code is improved by said substitution is enhanced by use of said method.

5. A computer-implemented method for determining whether execution of serialization operations of program code is improved by substituting at least one mutex serialized operation operating on said computer with at least one Compare and Swap serialized operation operating on said computer, said program code including at least one workload code fragment that is serialized said program code, and at least one input parameter, said method comprising:
executing said at least one workload code fragment with said input parameter and with said at least one mutex serialized operation while tracking mutex execution time;
storing said mutex execution time;
executing said at least one workload code fragment with said input parameter and with said at least one Compare and Swap serialized operation while tracking Compare and Swap execution time;
storing said Compare and Swap execution time;
comparing said stored mutex execution time to said stored Compare and Swap execution time;
based on said comparison of mutex execution time to Compare and Swap execution time, determining whether said execution of serialization operations of program code is improved by substituting said at least one mutex serialized operation with said at least one Compare and Swap serialized operation;
based on said comparison of mutex execution time to Compare and Swap execution time, changing said at least one workload code fragment if necessary;
based on said comparison of mutex execution time to Compare and Swap execution time, changing said at least one input parameter if necessary; and
if said at least one input parameter is changed or said at least one workload code fragment is changed repeating said method.

6. The method of claim 5, further comprising based on said comparison of mutex execution time to Compare and Swap execution time, tallying comparison results.

7. The method of claim 6, further comprising reporting said comparison results.

8. The method of claim 5 further comprising determining when execution of said serialization operations of said program code is improved by said substitution is enhanced by use of said method.

9. The computer system for determining whether execution of serialization operations of program code is improved by substituting at least one mutex serialized operation operating on said computer with at least one Compare and Swap serialized operation operating on said computer, said program code including at least one workload code fragment that is serialized said program code, comprising:
said at least one workload code fragment that executes with said at least one mutex serialized operation while tracking mutex execution time;
said at least one workload code fragment that executes with said at least one Compare and Swap serialized operation while tracking Compare and Swap execution time; and
said mutex execution time that is compared to said Compare and Swap execution time thereby determining when said execution of serialization operations of program code are improved by substituting said at least one mutex serialized operation with said at least one Compare and Swap serialized operation.

10. The computer system of claim 9, further comprising said program code that is ported from a UNIX computer system to said computer that includes OS/390 UNIX.

11. The computer system of claim 9, further comprising:
said mutex execution time that is stored in said computer; and
said Compare and Swap execution time that is stored in said computer.

12. The computer system of claim 9, further comprising, tallied comparison results that are based on said comparison of mutex execution time to Compare and Swap execution time.

13. The computer system of claim 12, further comprising a report of said comparison results.

14. An article of manufacture comprising a program storage medium usable by a computer and embodying one or more instructions executable by said computer for determining whether execution of serialization operations of program code is improved by substituting at least one mutex serialized operation operating on said computer with at least one Compare and Swap serialized operation operating on said computer, said program code including at least one workload code fragment that is serialized said program code, wherein:
said computer-executable instructions execute said at least one workload code fragment with said at least one mutex serialized operation while tracking mutex execution time;
said computer-executable instructions execute said at least one workload code fragment with said at least one Compare and Swap serialized operation while tracking Compare and Swap execution time;
said computer-executable instructions compare said mutex execution time to said Compare and Swap execution time; and
said computer-executable instructions determine from said comparison of mutex execution time to Compare and Swap execution time whether said execution of serialization operations of program code is improved by substituting said at least one mutex serialized operation with said at least one Compare and Swap serialized operation.

15. The article of manufacture of claim 14, wherein said computer-executable instructions port said program code from a UNIX computer system to said computer that includes OS/390 UNIX.

16. The article of manufacture of claim 14, wherein:
said computer-executable instructions store said mutex execution time; and
said computer-executable instructions store said Compare and Swap execution time.

17. An article of manufacture comprising a program storage medium usable by a computer and embodying one or more instructions executable by said computer for determining whether execution of serialization operations of program code is improved by substituting at least one mutex serialized operation operating on said computer with at least one Compare and Swap serialized operation operating on said computer, said program code including at least one workload code fragment that is serialized said program code, and at least one input parameter, wherein:

said computer-executable instructions execute said at least one workload code fragment with said input parameter and with said at least one mutex serialized operation while tracking mutex execution time;

said computer-executable instructions store said mutex execution time;

said computer-executable instructions execute said at least one workload code fragment with said input parameter and with said at least one Compare and Swap serialized operation while tracking Compare and Swap execution time;

said computer-executable instructions store said Compare and Swap execution time;

said computer-executable instructions compare said stored mutex execution time to said stored Compare and Swap execution time;

based on said comparison of mutex execution time to Compare and Swap execution time, said computer-executable instructions determine whether said execution of serialization operations of program code is improved by substituting said at least one mutex serialized operation with said at least one Compare and Swap serialized operation;

based on said comparison of mutex execution time to Compare and Swap execution time, said computer-executable instructions change said at least one workload code fragment if necessary;

based on said comparison of mutex execution time to Compare and Swap execution time, said computer-executable instructions change said at least one input parameter if necessary; and if said at least one input parameter is changed or said at least one workload code fragment is changed said computer-executable instructions are repeated.

18. The article of manufacture of claim 17, wherein based on said comparison of mutex execution time to Compare and Swap execution time, said computer-executable instructions tally comparison results.

19. The article of manufacture of claim 18, wherein said computer-executable instructions report said comparison results.

* * * * *